United States Patent

[11] 3,625,167

[72] Inventor Van Der Lely
 10, Weverskade, Ary, Maasland, Netherlands
[21] Appl. No. 798,283
[22] Filed Feb. 11, 1969
[45] Patented Dec. 7, 1971
[32] Priority Feb. 16, 1969
[33] Netherlands
[31] 6802209

[54] CULTIVATING IMPLEMENTS
 6 Claims, 6 Drawing Figs.
[52] U.S. Cl. ................................................... 111/87, 172/112, 222/112
[51] Int. Cl. ...................................................... A01c 5/00, A01b 33/00
[50] Field of Search ............................................ 111/85, 10, 6, 87; 222/486, 142; 172/112, 113, 122, 123, 32, 42, 554, 182

[56] References Cited
UNITED STATES PATENTS

| 1,512,596 | 10/1924 | Hamshaw | 172/122 X |
|---|---|---|---|
| 2,473,770 | 6/1949 | Seaman | 172/32 X |
| 3,316,865 | 5/1967 | Williams | 111/6 |
| 3,347,188 | 10/1967 | Richey | 172/123 X |
| 2,624,492 | 1/1953 | Seltzer | 222/486 X |
| 2,876,013 | 3/1959 | Neff | 222/142 |
| 3,179,312 | 4/1965 | Schwalm et al. | 222/486 |
| 3,194,193 | 7/1965 | Walters | 172/112 X |
| 3,224,347 | 12/1965 | Seaman | 172/112 X |
| 3,240,401 | 3/1966 | Kirschmann | 222/486 X |

FOREIGN PATENTS

| 277,066 | 7/1913 | Germany | |
| 1,094,681 | 12/1967 | Great Britain | |
| 1,110,043 | 4/1968 | Great Britain | |

Primary Examiner—Robert E. Pulfrey
Assistant Examiner—Stephen C. Pellegrino
Attorney—Mason, Mason & Albright ABSTRACT: This invention relates to cultivating implements or cultivators of the kind comprising a movable frame, a rotary shaft supported by the frame, soil-working members mounted on said shaft and a hood that partially surrounds said shaft and soil-working members in such a way that one edge thereof contacts, or is in close proximity to, the ground surface during a cultivating operation.

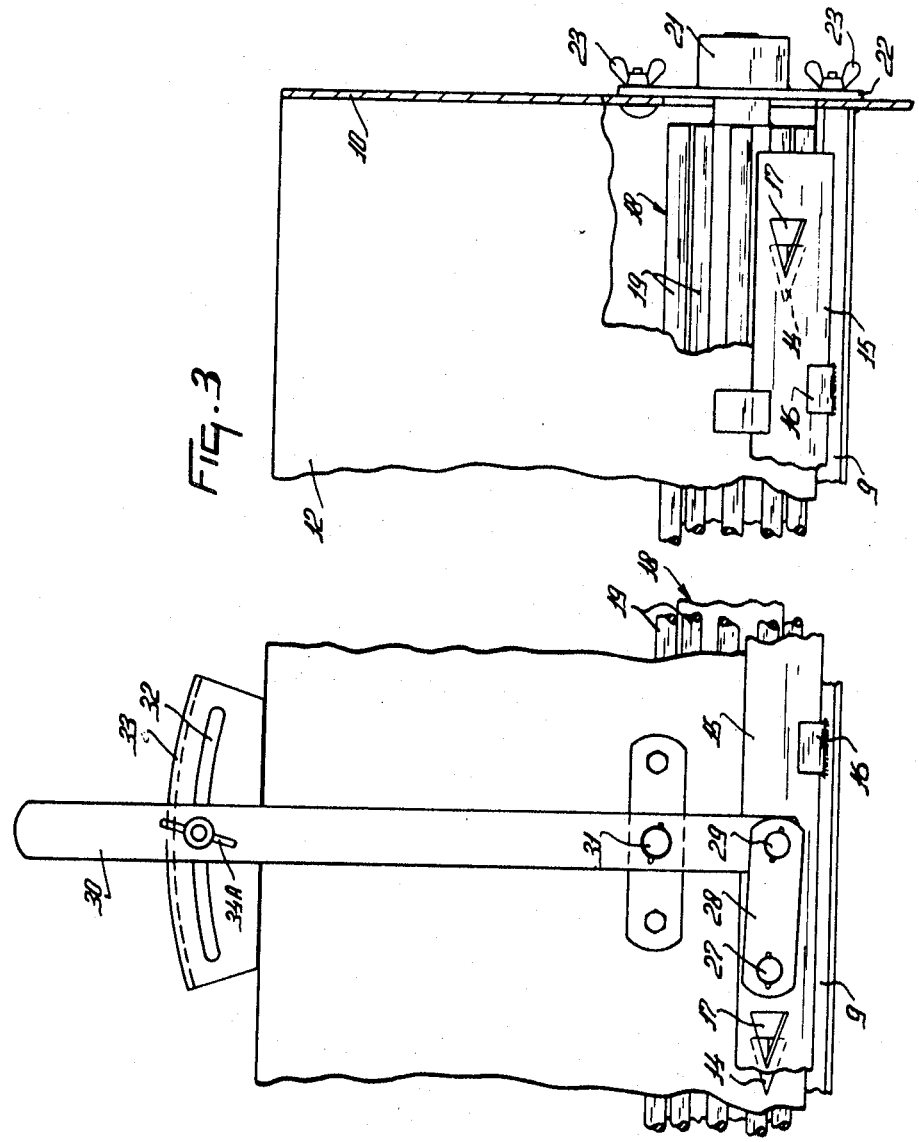

CULTIVATING IMPLEMENTS

According to the invention, there is provided a cultivating implement of the kind set forth, wherein a mechanism for sowing seeds into the soil worked by the implement during a cultivating operation is disposed between the uppermost level of the screening hood and the level of a lower edge thereof.

Figure 1:
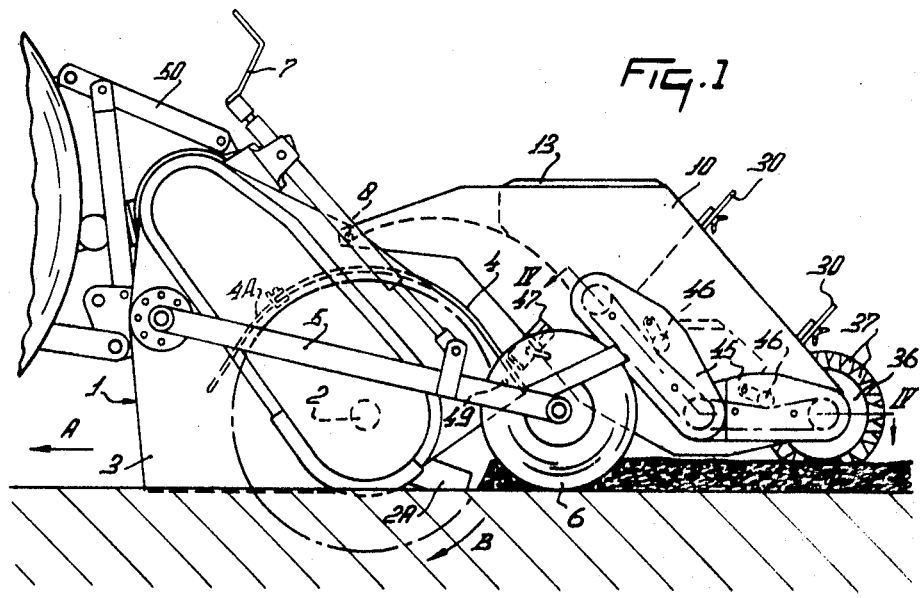
Figure 2:
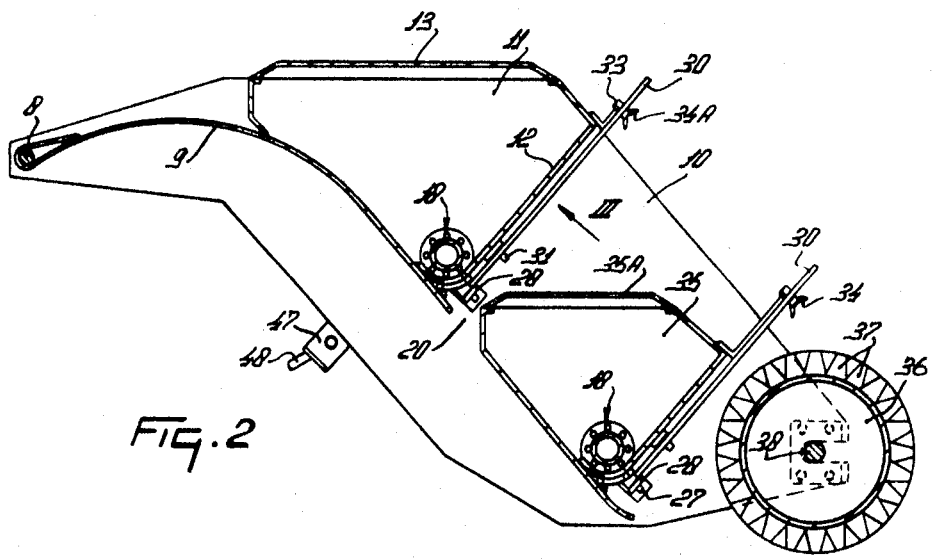
Figure 1A:
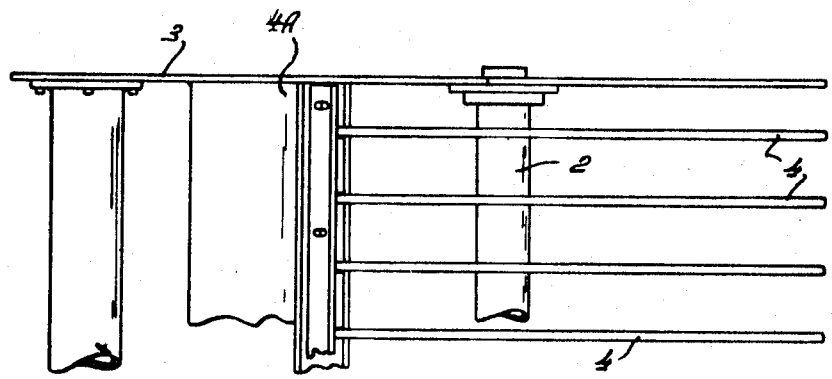
Figure 2A:
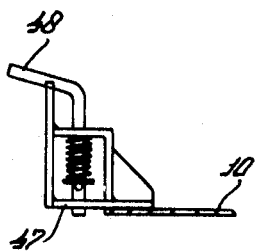
Figure 4:
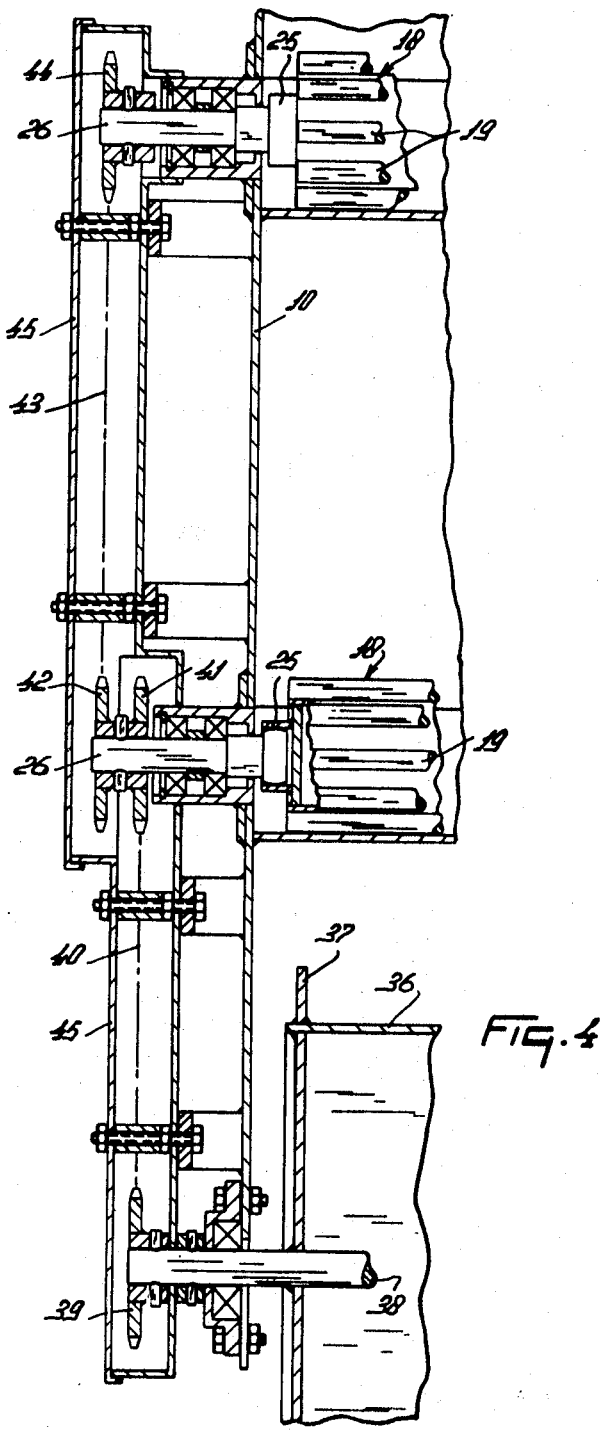

For a better understanding of the invention, and to show how the same may be carried into effect, reference will now be made, by way of example, to the accompanying drawings, in which:

FIG. 1 is a somewhat diagrammatic side elevation of a cultivating implement or cultivator in accordance with the invention mounted at the rear of an agricultural tractor, FIG. 1A is a plan view, in part, showing the connection between the rods and baffle plate, FIG. 2 is a sectional side elevation, to an enlarged scale, of the FIG. 1 cultivator with parts omitted to show the dosing members, FIG. 2A is a plan view of the bracket and locking pin for securing the hood to the cultivator frame, FIG. 3 is a rear elevation, to an enlarged scale, as seen in the direction indicated by the arrow III of FIG. 2, and FIG. 4 is a section, to an enlarged scale, taken on the line IV—IV of FIG. 1.

Referring to the drawings, the cultivating implement or cultivator which is illustrated has a frame which is generally indicated by the reference 1 in which a substantially horizontally disposed shaft 2 is rotatably mounted. The shaft 2 extends substantially perpendicular to the intended direction of operative travel of the cultivator which is indicated by an arrow A in FIG. 1 of the drawings and is provided with a plurality of soil-working members 2A that are spaced apart from one another both along the length of the shaft 2 and around the longitudinal axis of that shaft. The shaft 2 is, in fact, supported by two substantially vertical plates 3 of the frame 1 between which plates 3 lie a plurality of spring steel rods 4 arranged in horizontally spaced-apart relationship. The leading ends of the rods 4 are connected to a baffle plate by means of clamps and bolts (FIG. 1A) which partially surrounds the shaft 2 and its soil-working members 2A. The arrangement of the rods 4 is such that they form a resilient grille or grating. An arm 5 is pivotably connected to the outer side of one of the plates 3, the free and rearmost end of said arm 5 carrying the axle of a ground wheel 6. An adjusting member 7 which includes a manually rotatable spindle extends between an anchorage at the top of the to the arm 5 and can be operated to turn said arm 5 about its pivotal mounting to raise or lower the ground wheel 6 with respect to the frame 1. A hood 9 (FIG. 2) has its leading edge pivotally mounted between the plates 3 by means of substantially horizontally aligned pins 8 that define an axis extending perpendicular to the direction A. The hood 9 has a downward extension which affords a wall of a box 35 that will be described below. The lowermost edge of the downward extension which has just been mentioned either bears against, or is located in very close proximity to, the surface of the soil which has been worked by the foregoing members 2A during use of the cultivator.

Vertical plates 10 are located at the opposite lateral sides of the hood 9 and a container in the form of a box 11 extends perpendicularly between the two plates 10. It will be seen from the drawings that, in fact, the box 11 is constituted principally by the two plates 10, a portion of the hood 9 and a plate 12 that extends substantially perpendicular to the portion of the hood 9 which has just been mentioned. The top of the box 11 is closed by a lid or cover 13. The bottom of the box 11 is curved and is provided with a number of relatively spaced triangular openings 14. The openings 14 are, in fact, preferably spaced apart from one another by distances of 16 centimeters. A masking member 15 embraces the bottom of the box 11 and is slidable to and fro with respect thereto in a horizontal direction that is perpendicular to the direction A. The masking member 15 is maintained in position relative to the box 11 by lugs 16 that are fastened to the plate 12 at appropriate points.

The masking member 15 is formed with triangular outlets 17 that correspond in size and shape to the triangular openings 14 and that can be brought into register with those openings as required to regulate the rate of flow of material out of the box 11. A dosing member in the form of a roller 18 is located inside the box 11 with its axis of rotation substantially coincident with the axis of curvature of the curved bottom of the box. The roller 18 takes the form of a central tube having a plurality, such as eight, of rods or bars 19 fastened to its external surface in such a way that said rods or bars 19 extend parallel to one another and to the axis of the central tube in regularly spaced relationship around that axis. Thus, a number of recesses, corresponding in number to the rods or bars 19 that are provided, are formed around the roller 18, each recess extending lengthwise of said roller. It will be appreciated that, during rotation of the roller 18, material contained in box 11 is positively conveyed to the openings 14 inside the recesses formed between the rods or bars 19. It will be seen from FIG. 2 of the drawings that the outlets 17 open into a gap 20 which is formed between the lowermost edge of the hood 9 and the uppermost edge of the aforementioned downward extension of that screening hood. The gap 20 extends throughout the width of the screening hood 9 and, during use of the cultivator, material from the interior of the box 11 can be fed through the gap 20 to the leading side of the hood 9.

It can be seen from FIGS. 3 and 4 of the drawings that the roller 18 has a stub shaft at one of its ends received in a horizontal bearing 21 carried by a vertical plate 22 which is releasably secured to one of the two plates 10 by bolts or studs that cooperate with wingnuts 23. Thus, when the plate 22 is in its operative position, it closes an opening in the vertical plate 10 which opening is of sufficient diameter to allow the roller 18 to be passed axially therethrough. The end of the roller 18 that is remote from the plate 22 carries a socket 25 (FIG. 4) of noncircular internal configuration, said socket being in driven communication with the similarly profiled end of a driving shaft 26. The socket 25 is axially disengaged from the driving shaft 26 upon removal of the roller 18 from the interior of the box 11. In order to enable the masking member 15 to be moved lengthwise along the bottom of the box 11, said member 15 carries a pin 27 to which one end of an arm 28 is pivotally connected. The opposite end of the arm 28 is pivotally connected by a pin 29 to one end of a lever 30 whose fulcrum is afforded by a pivot pin 31 projecting from the lowermost and rearmost side of the plate 12. The upper end of the lever 30 can be moved by hand and bears against a sector plate 33 formed with an arcuate slot 32 whose center of curvature coincides with the axis of the pin 31. A bolt or the like is entered through the slot 32 and through a hole in the lever 30 and its shank is provided with a wingnut 34A which can be tightened to retain the lever 30 in any chosen setting relative to the sector plate 33 and thus retain the masking member 15 in a corresponding setting lengthwise of the bottom of the box 11.

It can be seen from the drawings, and particularly from FIG. 2 of those drawings, that a major portion of the box 11 together with the roller 18 and the associated parts for controlling the rate of flow of material out of the box 11 are located between the uppermost level of the hood 9 and the level of the foot of the extension of said hood which is in contact with, or in very close proximity to, the ground surface during operation of the cultivator. The box 11 is, in fact, intended to contain powdered, granular or crystalline fertilizer that is to be mixed with the top soil during the cultivation thereof.

As previously mentioned, the lowermost edge of the gap 20 is afforded by the upper end of a wall of the container or box 35, said wall constituting a downward extension of the hood 9 which is approximately coplanar with the neighboring region of the hood 9 itself. The box 35 is of smaller capacity than the box 11 and is located beneath said box 11. The box 35 has a lid or cover 35A and its shape and construction are substantially identical to those of the box 11 except in size. The box 35 is also provided with a dosing roller 18 and associated parts that are substantially identical in construction and arrangement to the corresponding parts that are associated with the box 11. Accordingly, the same references are employed to indicate such parts as have been used to relate to the box 11 and the elements that are associated therewith. However, it will be noted that the openings 14 in the bottom of the box 35 and the corresponding outlets 17 in the associated masking member 15 are preferably spaced apart from one another by distances of about 8 centimeters. Moreover, material leaving the openings 14 and outlets 17 which have just been mentioned arrives at the rearmost side of the extension of the hood 9 rather than at the foremost side thereof in the case of the box 11. The box 35 is provided with control mechanism for its masking member 15, said control mechanism being substantially identical to that which can be seen best in FIG. 3 in respect of the box 11 but being provided with a wingnut 34 that corresponds to the wingnut 34A.

The box 35 and the dosing mechanism that is associated therewith is intended for the sowing of seeds into the cultivated soil and, once again, it will be noted that both the box 35 and the flow control or dosing mechanism that is associated therewith is located between the uppermost level of the hood 9 and the level of the foot of the extension of that hood which foot normally touches the ground surface, or is located in very close proximity to the ground surface, during use of the cultivator. A pressure roller 36 is rotatably mounted between the two plates 10 and is located to the rear of the box 35 behind the region in which seeds will be delivered to the cultivated soil. The roller 36 extends throughout the length of the shaft 2 and is provided with a plurality of soil-engaging teeth 37 which bite into the soil and tend to ensure that the roller 36 rotates continuously during use of the cultivator. The roller 36 has a central mounting shaft 38 one end of which is provided with a sprocket wheel 39 (FIG. 4). The shaft 38 extends substantially parallel to the shaft 2 and the sprocket wheel 39 at its end is in driving connection, by way of a transmission chain 40, with a sprocket wheel 41 that is fastened to the driving shaft 26 for the dosing roller 18 associated with the box 35. A second sprocket wheel 42 is mounted alongside the sprocket wheel 41 and this second sprocket wheel is in driving communication, by way of a transmission chain 43, with a sprocket wheel 44 that is fastened to the end of the driving shaft 26 for the dosing roller 18 associated with the box 11. Both of the chains 40 and 43 are contained within corresponding casings 45 which casings also house spring-loaded jockey sprocket wheels or rollers 46 (FIG. 1) arranged to maintain the chains 40 and 43 in tension at all times.

One of the vertical plates 10 carries a forked bracket 47 (FIGS. 2 and 2A) which houses a spring-loaded locking pin 48. When the cultivator is transported from one place to another without performing any working operation, it is raised clear of contact with the ground by the three-point lifting device or hitch of an agricultural tractor or other vehicle and, under these conditions, the screening hood 9 and the parts that are connected thereto can be secured to the frame 1 by entering the tip of the locking pin 48 in a hole 49 (FIG. 1) formed in one of the vertical plates 3 of the frame 1. The front of the frame 1 is provided with a coupling member 50 which may be employed, in a generally known manner, in connecting the cultivator to the three-point lifting device or hitch of an agricultural tractor or other vehicle in the manner which can be seen in outline in FIG. 1 of the drawings.

In the use of the cultivating implement or cultivator which has been described, the coupling member 50 is connected to the three-point lifting device or hitch of an agricultural tractor or other vehicle and a forwardly projecting rotary input shaft (not shown) of the implement is placed in driven connection with the power takeoff shaft of the same tractor or other vehicle with the aid of an intermediate telescopic transmission shaft having universal joints at its opposite ends. When the cultivator is moved over a field in the direction A, the shaft 2 is rotated in the direction indicated by an arrow B in FIG. 1 of the drawings by way of intermediate transmission members which are not illustrated and which are not relevant to the present invention. The soil displaced by the soil-working members 2A is displaced around the shaft 2 beneath the aforementioned baffle or the like and is eventually thrown against the spring steel rods 4. Stones, roots, hard lumps of soil and other agricultural debris cannot pass through the gaps between the rods 4 and are guided downwardly along these rods to the bottom of the cavity excavated by the soil-working members 2A. Loose finely divided top soil, on the other hand, passes readily between the rods 4 and is subsequently guided downwardly by the hood 9 and its extension to fall back to the ground on top of any stones, roots or the like. The latter are thus effectively buried beneath a fine seed bed. When required, fertilizer and/or seeds can be delivered to the cultivated soil from the respective boxes 11 and 35. The levers 30 are preset to give the required rates of flow and it will be appreciated that delivery will not commence until drive from the roller 36 rotates the two rollers 18. It is noted once again that both fertilizer and seed are delivered at locations between the uppermost level of the hood 9 and the level of the foot of the extension of that hood.

In addition to driving the rollers 18, the pressure roller 36 compacts the seed bed and presses the seeds into the soil to a sufficient extent. When the rollers 18 require cleaning, they can be removed lengthwise through the openings in the two plates 10 that are normally covered by the corresponding plates 22. The cultivation implement which has been described is particularly useful in reseeding old meadows and other grassland and it will be appreciated that its use enables the top soil to be cultivated and fertilized and fresh grass seed to be sown in a single operation so that it is unnecessary for subsequent implements to move over the field creating unsightly tracks and causing other damage to the freshly sown seed bed. It is noted that it is within the scope of the invention to employ either fertilizer feeding mechanism alone or seed-feeding mechanism alone and it will be obvious that a cultivating implement which has both such mechanisms could employ either one or the other of them alone and could be used for the insertion into the cultivated soil of additional materials. For example, a soil pesticide could be mixed with the fertilizer and a fungicide and/or bird-repellent could be mixed with the grass or other seeds.

Having thus described my invention, what I claim as new and desire to secure by Letters Patent of the United States is:

1. A cultivating implement having a movable frame supporting rotatable soil-working members, and said soil-working members being mounted on a shaft to be rotated forwardly against the soil relative to the direction of travel, dispensing means mounted on said frame adjacent the rear of said members for dispensing material into the soil worked by said soil-working members, a grating positioned adjacent and partly above and to the rear of said soil-working members for separating the soil thrown up into finely divided soil constituents, at least part of which passes over said members and through said grating, and into larger soil constituents, which fall back to the bottom of the cavity excavated by said soil-working members, a hood on said frame located above said soil-working members and said grating, said hood having a lower edge which extends adjacent the cultivated soil, said dispensing means comprising at least one container with an outlet and a dosing member in said outlet to dispense material to mix with the finely divided soil constituents that pass through said grating, said material being dispensed from out of said outlet during operation of said implement and said outlet being located adjacent said hood above the lower edge thereof, said frame having connection means for attaching means to a three-point lifting device of an agricultural tractor.

2. The implement claimed in claim 1, wherein the lower edge of said hood is positioned adjacent the surface of soil which has been worked by said soil-working members during operation of said implement.

3. The implement claimed in claim 2, wherein said dispensing means includes a fertilizer mechanism mounted above a sowing mechanism, each of said mechanisms including a container with an outlet in the bottom thereof and a dosing member in said outlet with each dosing member being driven from a drive mechanism supported by said frame at one side of said hood, a pressure roller mounted for rotation on said implement and connected to said driving mechanism, said roller being supported by plates attached to said frame and said hood being disposed between said plates.

4. The implement claimed in claim 3, wherein said pressure roller is located to the rear of said hood with respect to the direction of travel and said pressure roller has ground engaging teeth.

5. The implement claimed in claim 4, wherein said roller extends substantially horizontally perpendicular to the direction of travel and said soil-working members are mounted on a shaft which extends parallel to said roller.

6. The implement as claimed in claim 5, wherein said hood is pivotable upwardly and downwardly relative to said frame during operation of the implement, about a pivot axis extending substantially parallel to the longitudinal axis of said shaft on which said soil-working members are mounted.

* * * * *